United States Patent Office 3,655,660
Patented Apr. 11, 1972

3,655,660
PROCESS FOR PREPARING PHTHALAZONE
Pierre Raoul, Epinay-sur-Orge, France, assignor to Pechiney-Saint Gobain, Neuilly-sur-Seine, France
No Drawing. Filed Sept. 21, 1970, Ser. No. 74,221
Int. Cl. C07d 51/06
U.S. Cl. 260—250 A          7 Claims

ABSTRACT OF THE DISCLOSURE

A process for preparation of phthalazone by reaction of 3-acetoxy-phthalide with hydrazine hydrate in aqueous solution.

---

This invention relates to the preparation of phthalazone. Phthalazone, having the formula

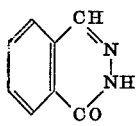

has been prepared from starting materials such as orthoxylene, phthalic anhydride, or naphthalene by processes which, although commercial, require a number of intermediate reactions.

Phthalazone can be prepared by the reaction of hydrazine sulphate on phthaldehyde acid (Beilstein, vol. 21, page 142); acid obtained from the orthoxylene with intermediate preparation of ortho-pentachloro-$\alpha,\alpha,\alpha,\alpha',\alpha'$, xylene, as described in U.S. Pat. No. 2,748,162.

Phthalazone can also be prepared by reaction of hydrazine on hydroxyphthalimidine (A. Dunet and A. Willemart, Bull. Soc. Chim. 1948, page 1081-3) obtained by reduction of the phthalimide (Ber. 1913, 46, page 1488) compound related to the phthalic anhydride (Org. Syn. 1941, col. 1, vol. I, page 457).

Phthalazone can also be obtained from naphthalene in accordance with the teaching of French Pat. No. 1,335,759 with preparation of the intermediate phthalonic acid and carboxylic phthalazone acid.

It is an object of this invention to provide a new and more efficient process for the preparation of phthalazone.

In accordance with the practice of this invention, phthalazone is prepared directly from 3-acetoxyphthalide having the formula

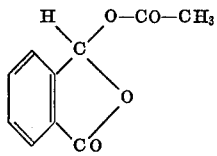

The 3-acetoxy-phthalide can be prepared directly from orthoxylene by the process described in the French application 6918215, filed June 3, 1969, in the name of the applicant and entitled, "New Process for the Preparation of 3-Acetoxy-Phthalide," whereby it becomes possible to provide a commercial process for the preparation of phthalazone from orthoxylene with only a single intermediate reaction. The corresponding application which has been filed in the U.S. Patent Office on May 25, 1970, as Ser. No. 41,159 describes the preparation of the acetoxy-3-phthalide by catalytic oxidation orthoxylene in acetic acid or a mixture of acetic acid and acetic anhydride at a temperature within the range of 80°–200° C.

The process of this invention for the preparation of phthalazone is characterized by the fact that, over a period of time which may range from ½ to 4 hours, a mixture of 3-acetoxyphthalide and an aqueous solution of hydrazine hydrate is heated to boiling and separation is made of the phthalazone that is thus formed.

In the preferred practice of this invention, the 3-acetoxy-phthalide and the hydrazine hydrate are reacted in the molar ratio of 1 mol 3-acetoxy-phthalide to 1–2 mols hydrazine hydrate in which the hydrate may be present in the aqueous solution in a concentration of about 95% by weight.

The phthalazone obtained at the end of the reaction is separated from the reaction medium by cooling, as to about 0° C., to crystallize out the phthalazone which can be separated, as by filtration or centrifuge.

The process of this invention gives yields of 100% phthalazone of high purity, in the form of crystals having a melting point of about 186°–187° C. Conversion rates of orthoxylene to 3-acetoxy-phthalide in the order of 60% can be obtained by the process described in the aforementioned U.S. application Ser. No. 41,159. Thus it becomes possible by the successive reactions of the above process and the process of the invention to prepare phthalazone from orthoxylene at a conversion rate as high as 60%.

The relatively pure phthalazone, prepared in accordance with the practice of this invention, can be used for the preparation of papers for thermocopies or for the preparation of hydrazino-phthalazine as hypertensors.

Having described the basic concept of this invention, the following example is given by way of illustration and not by way of limitation.

EXAMPLE

A mixture composed of 36 g. of 3-acetoxy-phthalide and 50 g. of 96% hydrazine hydrate in aqueous solution is heated for 3 hours at 100° C.

The medium is cooled to about 0° C. 73 g. of crystals are separated out by filtration, corresponding to a yield of 100%. The crystals are in the form of white needles having a melting point of 186° C–187° C. and are identified as phthalazone.

It will be apparent the invention provides a simple and efficient method for the production of phthalazone with a minimum number of intermediates and in high purity and high yield.

It will be understood that changes may be made in the formulation and reaction conditions without departing from the spirit of the invention, especially as defined in the following claims.

I claim:
1. The process for preparation of phthalazone comprising reacting 3-acetoxy-phthalide in an aqueous solution of hydrazine hydrate and the separating the phthalazone as crystals from the reaction mixture.
2. The process as claimed in claim 1 in which the reaction is carried out by heating the mixture to boiling point temperature.
3. The process as claimed in claim 2 in which the materials are reacted over a period of time within the range of ½–4 hours.
4. The process as claimed in claim 1 in which the materials are reacted in the ratio of 1 mol 3-acetoxy-phthalide to 1–2 mols hydrazine hydrate.

5. The process as claimed in claim 1 in which the hydrazine hydrate is present in a concentration of about 95% in the aqueous solution.

6. The process as claimed is claim 1 in which the phthalazone is separated out by cooling the reaction mixture to crystallize phthalazone that is formed and then separating the crystals from the remainder.

7. The process as claimed in claim 6 in which the reaction mixture is cooled to about 0° C. after reaction to crystallize phthalazone.

References Cited

UNITED STATES PATENTS 3,497,512   2/1970   Hofer et al. _____ 260—250 A

NICHOLAS S. RIZZO, Primary Examiner

U.S. Cl. X.R.

424—250

UNITED STATES PATENT OFFICE
CERTIFICATE OF CORRECTION

Patent No. 3,655,660                    Dated April 11, 1972

Inventor(s)     Pierre Raoul

It is certified that error appears in the above-identified patent and that said Letters Patent are hereby corrected as shown below:

Priority claimed on French application PV No. 69.32,556, filed September 24, 1969.

Signed and sealed this 22nd day of August 1972.

(SEAL)
Attest:

EDWARD M. FLETCHER, JR.                 ROBERT GOTTSCHALK
Attesting Officer                       Commissioner of Patents